United States Patent
Heath et al.

(10) Patent No.: US 10,703,063 B2
(45) Date of Patent: Jul. 7, 2020

(54) CONTAINER FORMING SYSTEM AND METHOD

(71) Applicant: Dematic Corp., Grand Rapids, MI (US)

(72) Inventors: Kevin M. Heath, Clarksville, MI (US); Anthony J. Paniczko, Grand Rapids, MI (US)

(73) Assignee: Dematic Corp., Grand Rapids, MI (US)

( * ) Notice: Subject to any disclaimer, the term of this patent is extended or adjusted under 35 U.S.C. 154(b) by 239 days.

(21) Appl. No.: 15/672,700

(22) Filed: Aug. 9, 2017

(65) Prior Publication Data
US 2018/0043650 A1 Feb. 15, 2018

Related U.S. Application Data

(60) Provisional application No. 62/373,003, filed on Aug. 10, 2016.

(51) Int. Cl.
*B31B 50/00* (2017.01)
*B31B 50/78* (2017.01)
(Continued)

(52) U.S. Cl.
CPC .............. *B31B 50/005* (2017.08); *B25J 11/00* (2013.01); *B25J 15/0616* (2013.01);
(Continued)

(58) Field of Classification Search
CPC ....... B31B 50/07; B31B 50/76; B31B 50/782; B31B 50/784; B31B 50/786;
(Continued)

(56) References Cited

U.S. PATENT DOCUMENTS 4,951,445 A * 8/1990 Thibault .............. B25J 15/0052
53/167
4,951,455 A 8/1990 Thibault
(Continued)

FOREIGN PATENT DOCUMENTS

JP 2005001304 A * 1/2005

OTHER PUBLICATIONS

English machine translation of Tanizaki (JP-2005001304-A) (Year: 2005).*
(Continued)

*Primary Examiner* — Chelsea E Stinson
*Assistant Examiner* — Himchan "Aiden" Song
(74) *Attorney, Agent, or Firm* — Gardner, Linn, Burkhart & Ondersma LLP

(57) ABSTRACT

A bulk bin forming system configured as a container forming cell includes a multi-axis robot to which is attached a multifunction tool. One or more collapsed card board boxes are located at a first station of the container forming cell adjacent the robot. The robot and multifunction tool are configured to operate to grasp and move an individual box, orient and pre-form the box by folding flaps at a second station of the cell, and then move the box to a third station of the cell to mount the box to a support configured as a pallet to thereby form a bulk bin or bulk box container referred to as a gaylord container. The tool may include vacuum grippers for grasping the boxes and staplers for securing the formed box to the pallet, and may also be used to fold the bottom flaps prior to mounting the box to the pallet.

17 Claims, 5 Drawing Sheets

(51) Int. Cl.
  *B31B 50/80* (2017.01)
  *B25J 11/00* (2006.01)
  *B31F 5/02* (2006.01)
  *B25J 15/06* (2006.01)
  *B31B 105/00* (2017.01)
  *B25J 9/04* (2006.01)
  *B65D 5/02* (2006.01)
  *B65G 59/04* (2006.01)

(52) U.S. Cl.
  CPC .......... *B31B 50/784* (2017.08); *B31B 50/804* (2017.08); *B31F 5/02* (2013.01); *B25J 9/046* (2013.01); *B31B 2105/0022* (2017.08); *B65D 5/0227* (2013.01); *B65G 59/04* (2013.01)

(58) Field of Classification Search
  CPC ..... B31B 50/787; B31B 50/80; B31B 50/802; B31B 50/804; B31B 2100/0024; B31B 2100/0026; B25J 11/00; B25J 15/0616; B25J 9/046; B65D 5/0227; B31F 5/02; B65G 59/04
  USPC ....... 493/309, 310, 314, 315, 316, 318, 313, 493/317; 53/564
  See application file for complete search history.

(56) References Cited

U.S. PATENT DOCUMENTS

| | | | | |
|---|---|---|---|---|
| 5,024,640 | A * | 6/1991 | Saitoh ................. | B31B 50/00 493/116 |
| 5,105,600 | A * | 4/1992 | DePoint, Jr. ............ | B65B 5/024 53/157 |
| 6,409,647 | B1 * | 6/2002 | Bevins ................. | B65B 43/285 493/309 |
| 8,128,547 | B2 * | 3/2012 | Graham ................. | B31B 50/00 493/167 |
| 9,550,624 | B2 | 1/2017 | Khodl et al. | |
| 2002/0078661 | A1 * | 6/2002 | Bowden ................. | B65B 11/025 53/397 |
| 2013/0036716 | A1 * | 2/2013 | Tsutsumi .............. | B65B 43/305 53/564 |
| 2014/0179501 | A1 * | 6/2014 | Akama ................. | B25J 9/0096 493/162 |
| 2018/0043650 | A1 * | 2/2018 | Heath ................. | B31B 50/005 |

OTHER PUBLICATIONS

International Search Report and Written Opinion of the International Searching Authority from corresponding Patent Cooperation Treaty (PCT) Application No. PCT/IB2017/054871, indicated completed on Nov. 27, 2017.

* cited by examiner

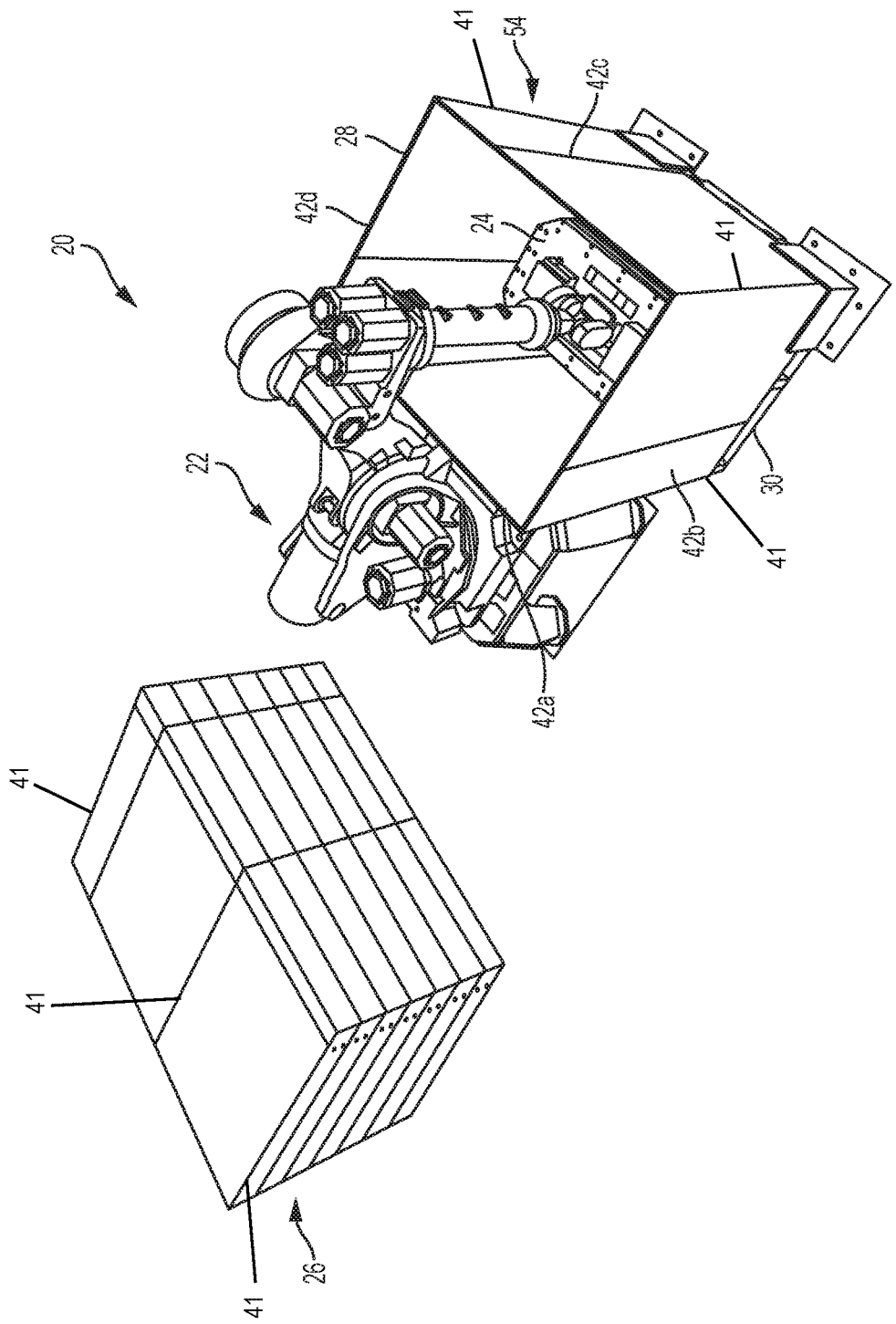

CONTAINER FORMING SYSTEM AND METHOD

CROSS REFERENCE TO RELATED APPLICATION

The present application claims priority of U.S. provisional application Ser. No. 62/373,003 filed Aug. 10, 2016, which is hereby incorporated herein by reference in its entirety.

BACKGROUND OF THE INVENTION

The present invention is directed to a system and method for forming containers, and in particular for forming bulk bin containers referred to as gaylord containers.

Gaylord bulk bin or bulk box pallet-mounted containers are constructed to include an upper portion constructed of a multisided structural box, such as formed from cardboard that is mounted on a pallet, with the pallet forming a lower portion of the container.

SUMMARY OF THE INVENTION

The present invention provides a container construction system in the form of a robotic assembly cell for the construction of gaylord containers.

According to an aspect of the present invention, a container construction system comprises a multi-axis robot having an arm to which a tool is mounted, with the tool including a gripper or lifter component configured to grasp a box to enable the robot to move the box, a folder component configured to fold flaps of the box, and an automated fastener to secure the box to a support, such as a pallet. The system includes an input location configured to retain or receive a box in a collapsed orientation, an orientation location that includes a first alignment jig, and a mounting location that includes a second alignment jig. The robot is configured to grasp a box in a collapsed orientation at the input location via the lifter component of the tool, where lifting of the box by the robot causes the box to expand. The robot then inserts the box when in an expanded condition into a first jig at the orientation location in an upside down orientation to position the box. The box includes bottom flaps, with the folder component of the tool configured to fold the bottom flaps of the box when the box is inserted into the first jig. The robot is further configured to insert the box into the second jig on top of a pallet disposed at the mounting location.

In accordance with particular aspects of the container construction system, the robot is in a fixed location with the input, orientation and mounting locations being disposed about the robot. The first and/or second alignment jigs may comprise brackets against which the box is located, such as a bracket affixed to a floor surface. The brackets may be multi-component devices and include L-shaped portions to receive corners of a box and or pallet. The tool mounted to the robot may include vacuum grippers for grasping the boxes, and may include staplers or other automated fastener devices or systems for securing the box to the pallet.

A method of constructing a container in accordance with an aspect of the invention includes providing a box having folds and flaps with the box being in a collapsed orientation at an input location, grasping and lifting the box with a multi-axis robot from the input location, wherein the box expands when lifted, orienting the box into a known position, folding flaps of the box, placing the box on top of a support, such as a pallet, and securing the box to the support.

The robot may include an end effector comprising a tool that is configured for at least one of grasping the box, folding flaps of the box, and securing the box to the pallet.

In accordance with particular aspects of the container construction method includes moving the box from the input location to an orientation location via the multi-axis robot, placing the box when in an expanded orientation into an alignment jig at the orientation location via the multi-axis robot, folding flaps of the box via the multi-axis robot while the box is positioned at the alignment jig of the orientation location, and lifting and moving the box to a mounting location via the multi-axis robot, and placing the box on top of a pallet located in an alignment jig at the mounting location via the multi-axis robot. The boxes at the input location may be stacked in a generally horizontal orientation when collapsed prior to grasping and lifting a box. The box may be moved to different stations by the robot, with the robot simultaneously rotating the box to orient it for the next stage of construction.

In a further embodiment, a method of constructing a container comprises using a multi-axis robot arm to which an end effector comprising a tool is mounted to grasp a collapsed box from an input location, with the tool including a gripper for grasping the collapsed box, lifting the collapsed box with the robot arm to expand the box, folding flaps on an end of the expanded box, placing the expanded box on a pallet with the robot arm with the folded flaps adjacent the pallet, and securing the expanded box to the pallet.

In accordance with particular aspects of the construction method, the expanded box may be placed against a jig to orient the box, such as in an upside down orientation, and the flaps may be folded by the tool of the robot arm. The flaps may be folded while the expanded box is in an upside down orientation, with the box rotated by the robot arm for placement on the pallet, including positioning against a further jig.

In a still further embodiment, the method comprises grasping a collapsed box from an input location with a multi-axis robot, expanding the box with the robot, folding flaps on an end of the expanded box with the robot, and placing the expanded box on a pallet with the robot with the folded flaps adjacent the pallet.

The container construction system and method of the present invention thus provides an accurate and efficient manner to produce bulk bin containers. These and other objects, advantages, purposes and features of this invention will become apparent upon review of the following specification in conjunction with the drawings.

BRIEF DESCRIPTION OF THE DRAWINGS

FIG. 5 is a perspective view of the container forming cell of FIG. 1 shown from the orientation of FIG. 3 illustrating the expanded box being secured to the pallet by the multi-axis robot and multifunction tool.

DESCRIPTION OF THE PREFERRED EMBODIMENTS

Figure 1:
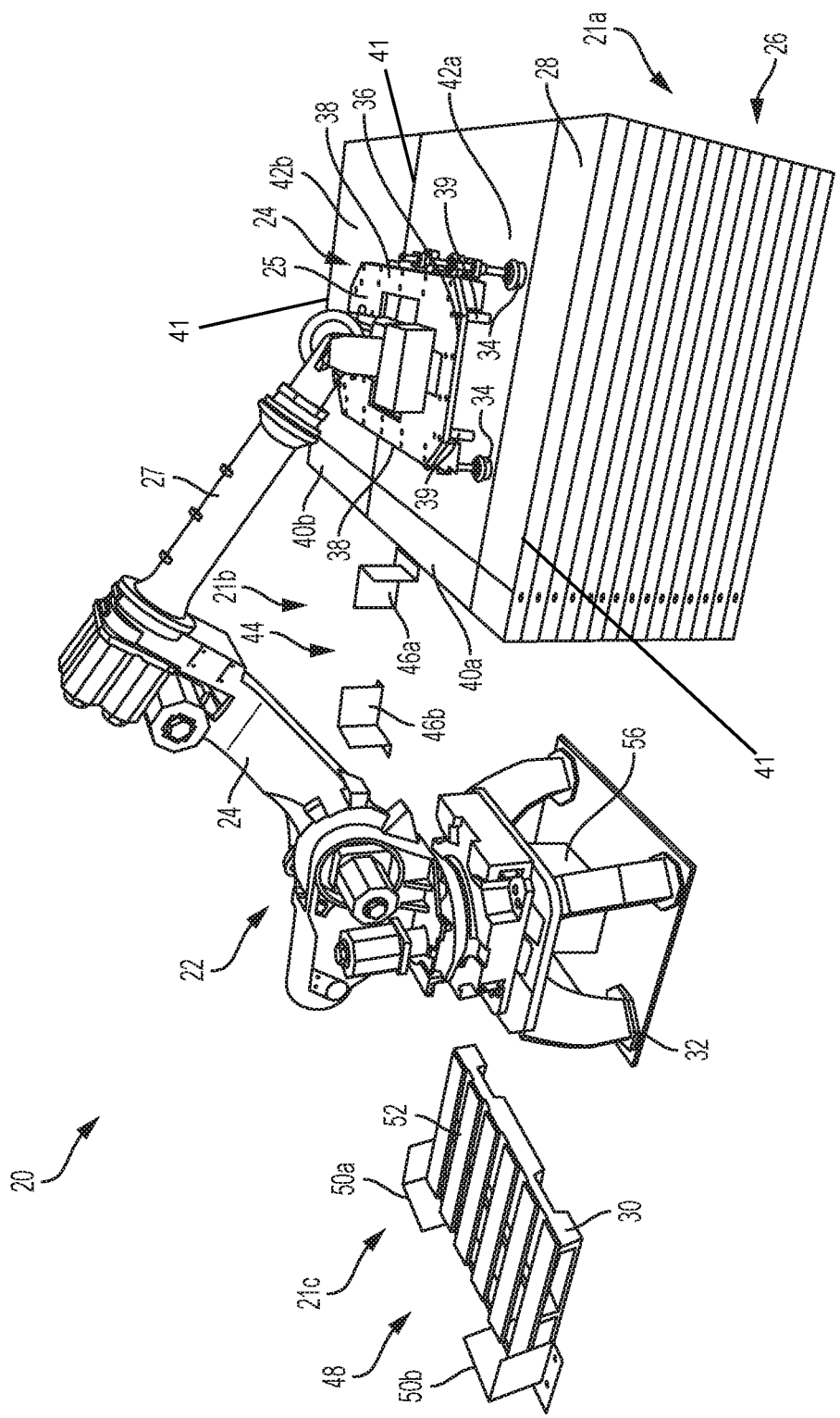
FIG. 1 is a perspective view of a container forming cell in accordance with the present invention illustrating a multi-axis robot with a multifunction tool engaging a collapsed box from a stack.

The present invention will now be described with reference to the accompanying figures, wherein the numbered elements in the following written description correspond to like-numbered elements in the figures. A bulk bin forming system 20 is illustrated in FIG. 1 that is configured as a container forming cell, where the forming cell may be employed in a material handling facility or the like. System 20 includes a multi-axis robot 22 to which is attached an end effector configured as a multifunction tool 24. A stack 26 of collapsed card board boxes 28 is located at a first station or position 21*a* of the container forming cell adjacent robot 22, which comprises an input location for boxes 28 in a collapsed orientation. As discussed below, robot 22 and multifunction tool 24 are configured to operate to grasp an individual box 28, orient and pre-form the box 28 at a second station or position 21*b* of the cell that comprises an orientation location, and mount the box 28 to a support configured as a pallet 30 at a third station or position 21*c* of the cell, which comprises a mounting location, to thereby form a bulk bin or bulk box container referred to as a gaylord container.

With reference to the illustrated embodiment, multi-axis robot 22 may be constructed as a five or six axis robot and include a lower arm 24 and an upper arm 27, and is shown to be mounted on a centrally located stand 32. Multifunction tool 24 is mounted to a distal end of robot 22, such as on a wrist connected with arm 27. In the illustrated embodiment, multifunction tool 24 includes a plate member 25 with channels mounted to a bottom side of the plate member 25. Tool 24 includes a gripper or gripper member 34, such as a holder or lifter, where the grippers 34 in the illustrated embodiment comprises vacuum grippers. Tool 24 further includes flap folder members or portions 36, 38 and automated fasteners or fastener devices 39, such as staplers or glue guns. As discussed in more detail below, vacuum grippers 34 enable tool 24 to grasp boxes 28 to move and orient the boxes 28, flap folder members 36, 38 enable tool 24 to bend and position flaps 40*a*, 40*b*, 40*c*, 40*d* on boxes 28, and the automated fasteners of tool 24 are used to secure boxes 28 to pallets 30.

Referring to FIG. 1, robot 22 initially positions tool 24 to grasp the upper most collapsed box 28 of stack 26, with stack 26 being located at the first station 21*a* of the cell. Tool 24 is moved into position at or above a side panel 42*a* of the box 28 and vacuum grippers 34 of tool 24 are then engaged to lift box 28. The lifting of box 28 from the generally planar collapsed orientation of stack 26 causes box 28 to expand along pre-existing bend or fold lines 41 of the collapsed box 28 into a generally rectangular shape having side panels 42*a*, 42*b*, 42*c*, 42*d* defined. Upon the uppermost box 28 being raised above the remaining collapsed boxes in the stack, robot 22 rotates along at least two axis to both rotate the box 28 into a vertical orientation and move the box 28 to the second station 21*b*. The box 28 thus takes its expanded rectangular shape as defined by fold lines 41 extending axially or vertically relative to the orientation of the container.

Figure 2:
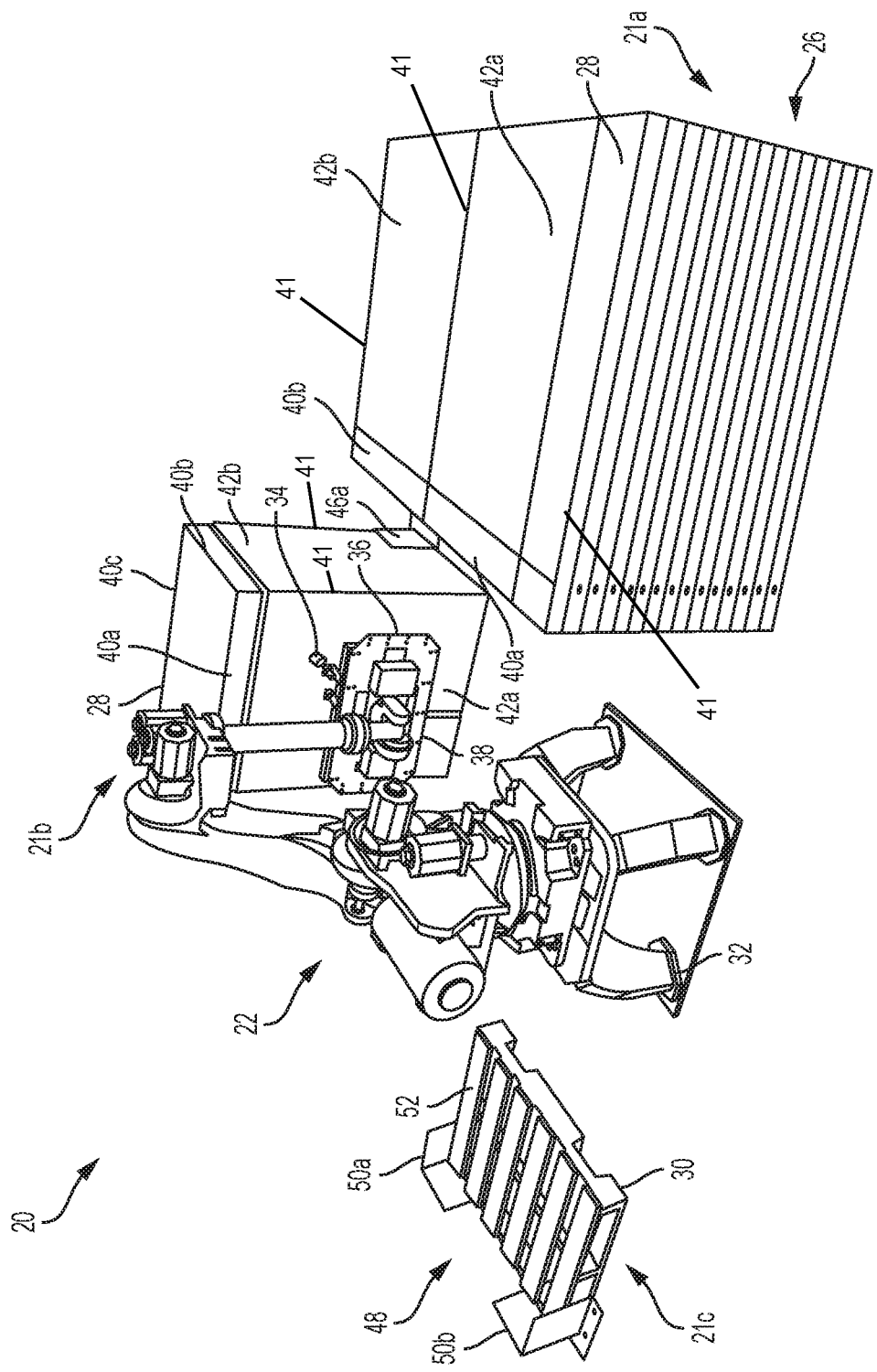
FIG. 2 is a perspective view of the container forming cell of FIG. 1 with the multi-axis robot orienting an expanded box in a jig.
Figure 3:
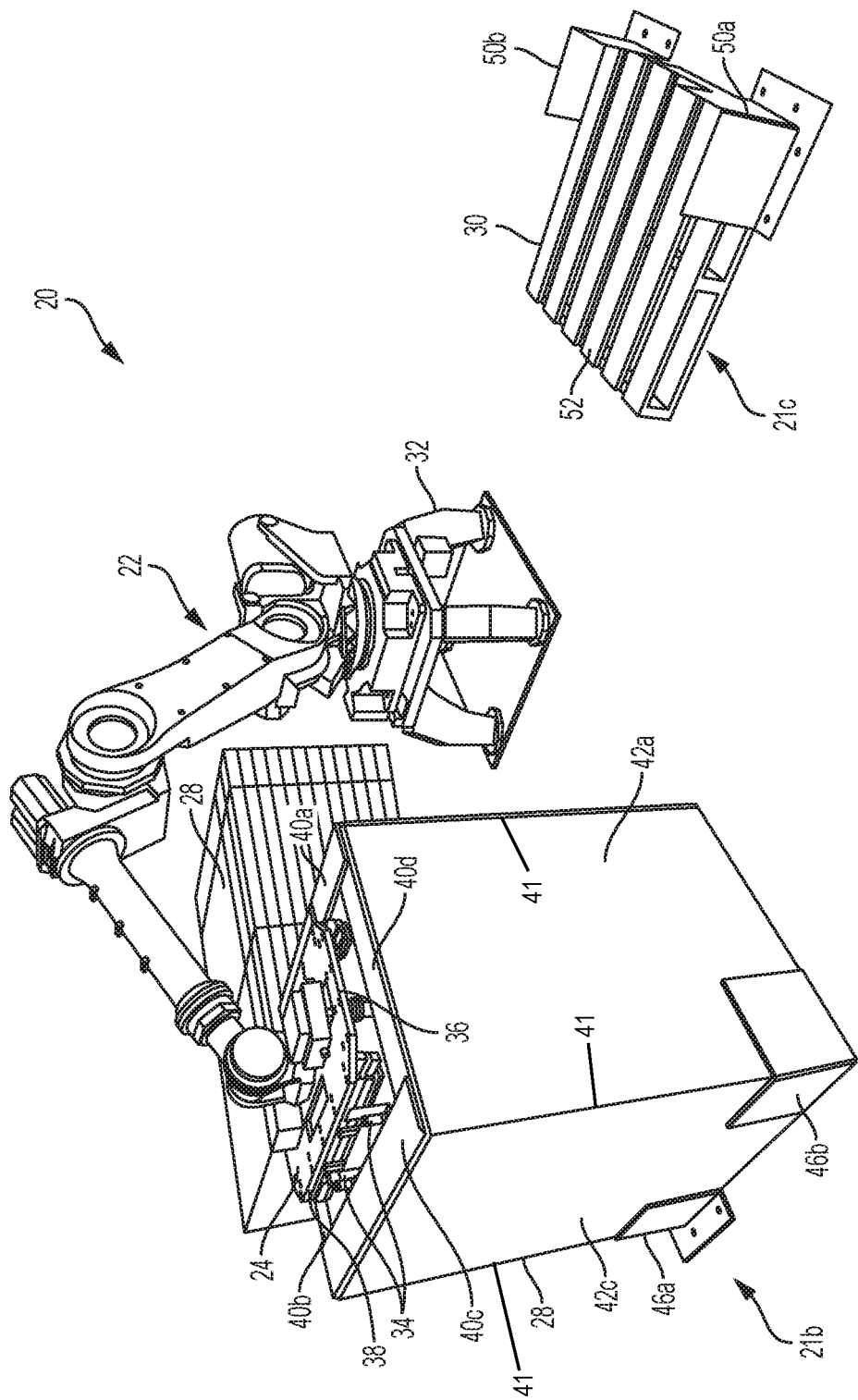
FIG. 3 is a perspective view of the container forming cell of FIG. 1 shown from an opposite orientation illustrating the multi-axis robot and multifunction tool folding end flaps of the container to form the bottom of the expanded box.

FIGS. 2 and 3 disclose the expanded box 28 located at the second station, with box 28 inserted into an orientation or containment jig 44 to square the box 28 into a known position and orientation. In the illustrated embodiment, orientation jig 44 comprises a pair of upright alignment brackets 46*a*, 46*b* formed as generally L-shaped members with horizontally extending flanges that are used to secure brackets 46*a*, 46*b* to the floor, such as via bolts. As shown, brackets 46*a*, 46*b* are spaced with respect to one another substantially equivalent to the width of a selected side panel 42 of box 28. It should be appreciated that alternative configurations of containment jigs may be employed within the scope of the present invention. For example, rather than a pair of brackets 46*a*, 46*b*, a single piece and/or adjustable containment jig may be employed.

In the illustrated embodiment, box 28 is oriented at station 21*b* in an upside down orientation with the bottom portion of box 28 extending upwards such that the bottom or end flaps 40*a*, 40*b*, 40*c*, 40*d* are accessible. The flaps 40*a*, 40*b*, 40*c*, 40*d* are defined by fold or bend lines in the collapsed box 28 that extend laterally relative to the normal orientation of the constructed container, with each flap in the illustrated embodiment being associated with a respective side panel 42*a*, 42*b*, 42*c*, 42*d*.

Upon orienting box 28 into containment jig 44, tool 24 disengages from engagement with side 42*a* as is disclosed in FIG. 2. Robot 22 then moves tool 24 upward toward the bottom or end flaps 40*a*, 40*b*, 40*c*, 40*d* to bend the flaps by way of flap folder members 36, 38 to form the bottom of the box 28, as is shown in FIG. 3. Tool 24 may be constructed, for example, whereby members 36 are defined by the two opposite shorter edges of tool 24 and are used for folding the respective shorter flaps 40*b*, 40*d*. Correspondingly, members 38 may be defined by or located on the two opposite longer portions of tool 24 and configured for folding the respective longer flaps 40*a*, 40*c* of box 28. It should be appreciated that flap folder members may be alternatively constructed. For example, members 36 or 38 may be constructed to extend outwardly to a greater degree relative to the plane defined by plate 25, or may comprise tabs or grippers used to grasp the flaps, or may be integrated or defined by vacuum grippers 34. Still further, additional or alternative fixtures may be employed against which the box 28 is moved to achieve the folding of the flaps. This may include, for example, fixtures mounted to the floor with elevated portions. In operation, the robot 22 and tool 24 would be used to move the box 28 into or against such a fixture to fold or partially fold the flaps of the box.

In the illustrated embodiment of box 28, end flaps 40*a*, 40*b*, 40*c*, 40*d* are sized whereby when folded the flaps 40*a*, 40*b*, 40*c*, 40*d* do not form a solid or enclosed bottom, but rather leave an opening bounded by the folded flaps. Alternatively configured boxes and/or flaps may be used, however, including boxes with full bottom flaps and/or alternatively sized and shaped boxes, including square shaped boxes, or boxes having additional panels and/or folds. Optionally one or more of the overlapping portions of flaps 40*a*, 40*b*, 40*c*, 40*d* may be secured together, such as via the automatic fasteners 39, to aid in retaining the flaps in the desired orientation.

Figure 4:
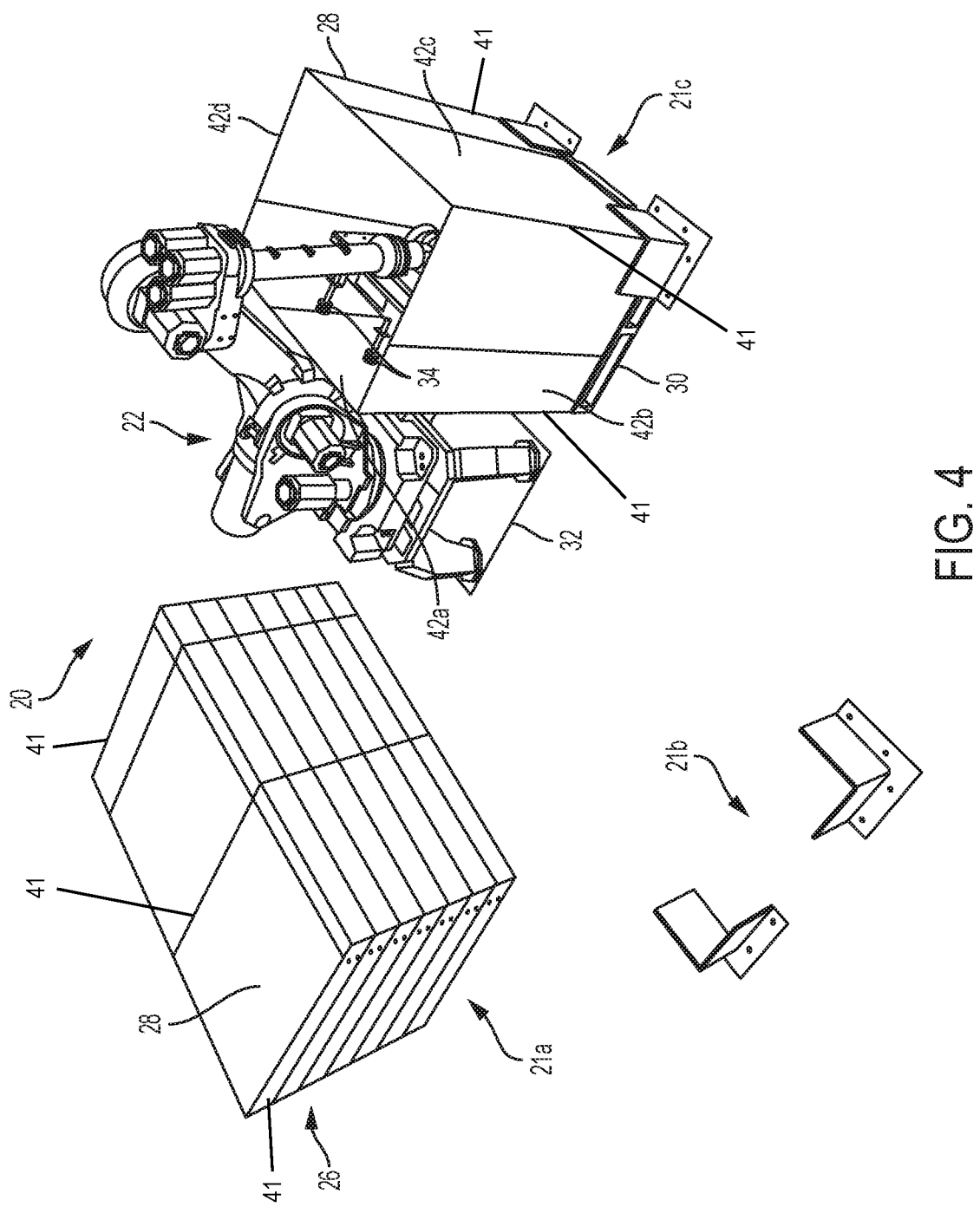
FIG. 4 is a perspective view of the container forming cell of FIG. 1 shown from the orientation of FIG. 3 illustrating the placement of the expanded box by the multi-axis robot and multifunction tool in an upright orientation on a pallet.

Upon folding the end flaps into position at station 21*b*, robot 22 moves tool 24 to grasp a side panel 42 of box 28 to simultaneously lift, move and re-orient box 28 into an upright orientation and place box 28 on top of pallet 30 that is positioned at a second jig 48 at station 21*c*, where jig 48 comprises another orientation or containment jig 48 that is substantially similar to containment jig 44, with jig 48 including a pair of alignment brackets 50*a*, 50*b*. As understood from FIGS. 3-5, alignment brackets 50*a*, 50*b* extend upwards above the top surface 52 of pallet 30 formed by the slats of pallet 30 whereby box 28 is able to contact the brackets 50a, 50b when positioned on pallet 30 at station 21c. In addition, the perimeter or outer profile of box 28 is sized to be generally equal with the outer perimeter of pallet 30 such that upon robot 22 moving box 28 into position engagement with containment jig 48 on pallet 30, box 28 is properly located for securing to pallet 30. As such, jig 48 may also be referred to as a mounting jig. In the illustrated embodiment, as understood from FIG. 4, tool 24 via vacuum grippers 34 may grasp the interior surface of side panel 42a for moving box 28 to station 21c and/or orienting box 28 on pallet 30 at station 21c.

As understood from FIG. 5, tool 24 is then used to secure box 28 to pallet 30 via one or more automated fasteners 39, such as staplers or glue guns disposed on a bottom side of tool 24. Robot 22 moves tool 24 into position whereby tool 24, in the case of staplers, is able to drive staples through the folded end flaps 40a, 40b, 40c, 40d into pallet 30, such as into slats of pallet 30. Likewise, in the case of glue guns, tool 24 is used to apply a bead of glue to pallet 30 for securing box 28 thereto. Alternative automated fasteners may be employed, such as fastener guns for driving nails or screws. It should additionally be appreciated that box 28 may be alternatively oriented while being affixed to pallet 30, such as while being stapled or glued, as compared to the orientation shown in FIG. 5.

Upon completion of the constructed gaylord container 54, container 54 is then removed from station 21c to be used in material handling operations, such as to be filed with objects within a material handling facility. Container 54 may be removed from station 21c by robot 22, or may be moved by alternative equipment (not shown). Upon removal of container 54 a subsequent pallet 30 is then placed at station 21c by being oriented within containment jig 48 for construction of another gaylord container. The subsequently located pallet 30 may be positioned at station 21c by, for example, robot 22, by another robot or an automated or semi-automated device (not shown), or by an operator (not shown), such as by being provided from a stack of such pallets. Subsequent to or simultaneous with the locating of a subsequent pallet at station 21c, robot 22 may rotate to grasp the next collapsed box 28 from the top of stack 26 for forming another gaylord container.

It should be appreciated that a controller may be employed for controlling the movement of robot 22 and use of tool 24, such as via controller 56 (FIG. 1). Controller 56 may be programmed to know the locations of the stations 21a, 21b, 21c. Still further, robot 22 may be equipped with sensors, such as on tool 24 or elsewhere, for detecting and confirming, for example, when tool 24 has grasped a box 28. Moreover, system 20 may be configured for constructing alternatively sized and shaped containers, including via boxes having different sizes and/or shapes. Still further, although box 28 is shown in a general vertical orientation in station 21b when the flaps are folded, and in station 21c when the box 28 is secured to the pallet 30, alternative orientations may be employed, such as angled or rotated from that shown. Likewise, although the stack 26 of collapsed boxes 28 are shown in a horizontal orientation at the input location, alternative manners of storing and orienting the collapsed boxes 28 may be employed.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A method of constructing a container, said method comprising:
   using a single multi-axis robot arm to which an end effector comprising a tool is mounted to grasp a collapsed box from an input location, with the tool including a gripper for grasping a side panel of the collapsed box, wherein the box includes a plurality of side panels that are foldably connected together and wherein the tool grasps one of the side panels;
   lifting the collapsed box with the robot arm to expand the box, wherein lifting the box at the grasped one of the side panels causes the box to expand;
   folding flaps on an end of the expanded box with the robot arm;
   placing the expanded box on a pallet with the robot arm with the folded flaps adjacent the pallet; and
   securing the expanded box while empty directly to the pallet through the folded flaps with the robot arm;
   wherein a single expanded box is sized and secured to the pallet to form the container whereby goods may be placed into the expanded box.

2. The method of claim 1, further comprising placing the expanded box into a first location with the robot arm after said lifting the collapsed box with the robot arm and prior to said folding the flaps on the end of the expanded box, and wherein said placing the expanded box into the first location comprises placing the expanded box against a containment jig.

3. The method of claim 2, wherein said placing the expanded box against the containment jig comprises placing the expanded box in an upside down orientation whereby the flaps are oriented upwards.

4. The method of claim 2, wherein said folding the flaps on the end of the expanded box comprises folding the flaps with the tool of the robot arm.

5. The method of claim 1, further comprising rotating the expanded box with the robot arm after said folding the flaps on the end of the expanded box and prior to said placing the expanded box on a pallet with the robot arm.

6. The method of claim 5, wherein said placing the expanded box on the pallet with the robot arm comprises placing the expanded box against a jig to orient the expanded box on the pallet.

7. The method of claim 1, wherein said securing the expanded box to the pallet comprises securing the expanded box to the pallet with the end effector of the robot arm.

8. The method of claim 1, wherein a stack of collapsed boxes are located at the input location and wherein said using the multi-axis robot arm to which the end effector comprising the tool is mounted to grasp the collapsed box from the input location comprises grasping the collapsed box from the stack.

9. The method of claim 1, wherein the gripper of the tool comprises a vacuum gripper.

10. A method of constructing a container, said method comprising:
    grasping a collapsed box from an input location with a single multi-axis robot arm, wherein the box includes a plurality of side panels that are foldably connected together and wherein the robot arm grasps one of the side panels;
    expanding the box with the robot by lifting the grasped one of the side panels such that other of the side panels fold relative to the grasped one of the side panels;

folding flaps on an end of the expanded box with the robot;

placing the expanded box on a pallet with the robot with the folded flaps adjacent the pallet; and securing the expanded box while empty directly to the pallet through the folded flaps with the robot arm.

11. The method of claim 10, further comprising placing the expanded box into a first location with the robot after said expanding the box with the robot and prior to said folding the flaps on the end of the expanded box with the robot.

12. The method of claim 11, wherein said placing the expanded box into the first location comprises placing the expanded box against a containment jig.

13. The method of claim 12, wherein said placing the expanded box against the containment jig comprises placing the expanded box in an upside down orientation whereby the flaps are oriented upwards.

14. The method of claim 13, wherein said folding the flaps on the end of the expanded box comprises folding the flaps while the expanded box is positioned against the containment jig in the upside down orientation.

15. The method of claim 10, wherein said placing the expanded box on the pallet with the robot comprises placing the expanded box against a jig to orient the expanded box on the pallet.

16. The method of claim 10, wherein said grasping a collapsed box from an input location comprises grasping with an end effector of the robot arm, with the end effector comprising a tool having a gripper.

17. The method of claim 15, wherein said folding the flaps on the end of the expanded box comprises folding the flaps on the end of the expanded box with the tool of the robot arm.

\* \* \* \* \*